Patented Oct. 9, 1951

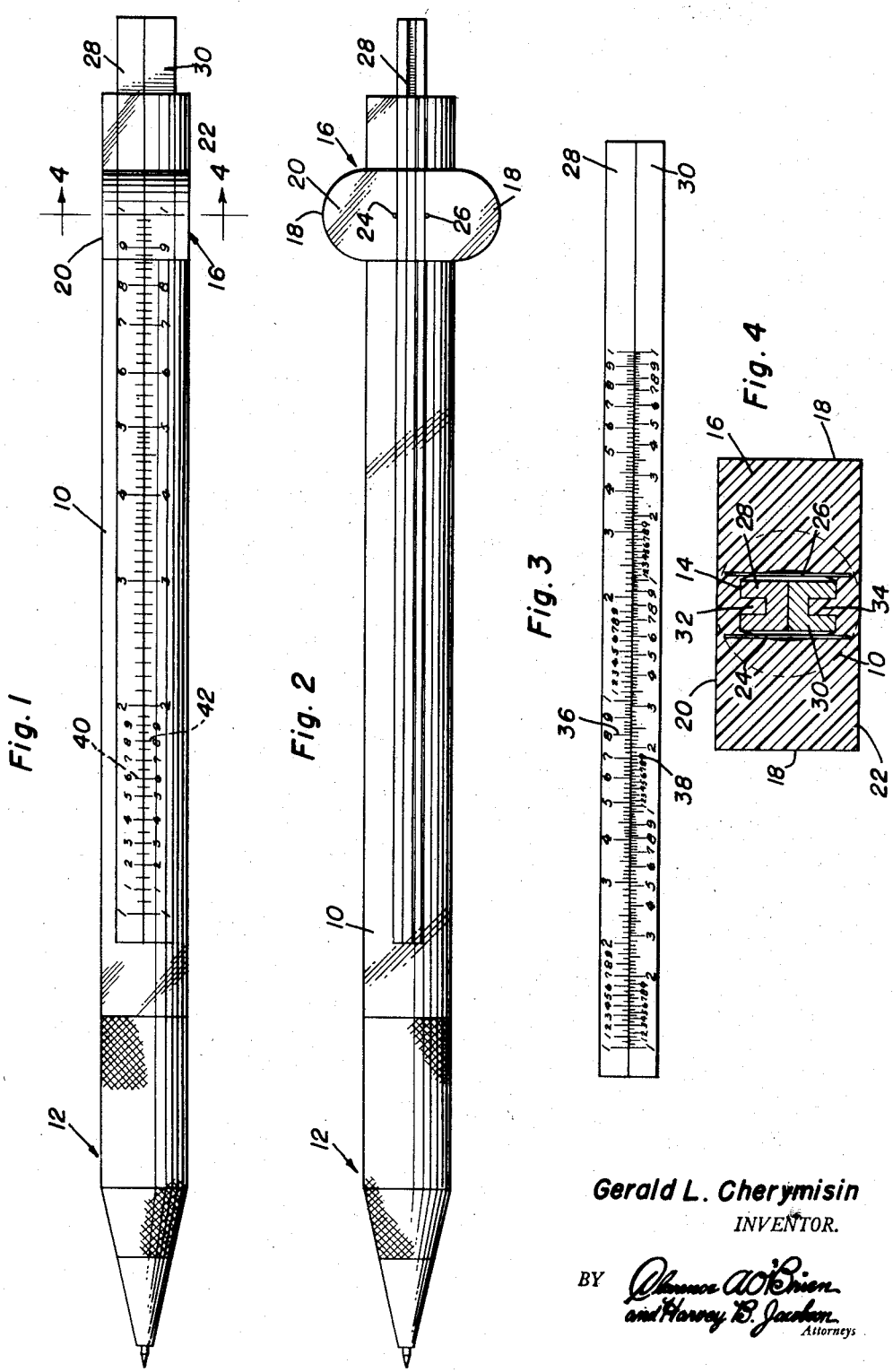

2,570,642

UNITED STATES PATENT OFFICE 2,570,642

SLIDE RULE PENCIL

Gerald L. Cherymisin, Alta Loma, Calif.

Application March 30, 1951, Serial No. 218,405

5 Claims. (Cl. 235—70)

This invention relates to new and useful improvements in calculating devices, and the primary object of the present invention is to provide a pencil having a slide rule embodied therein.

Another object of the present invention is to provide a slide rule pencil including a transparent cylindrical shank having a groove therein that slidably receives a pair of graduated channel-shaped slides which are disposed in back-to-back contacting relationship.

A further object of the present invention is to provide a slide rule pencil that is extremely small and compact in structure to be conveniently and comfortably carried in a user's pocket.

A still further aim of the present invention is to provide a pencil of the automatic or mechanical type having a small slide rule that is quickly and readily operated for indicating various calculations and which is extremely inexpensive to manufacture.

Other objects and advantages reside in the details of construction and operation as more fully hereinafter described and claimed, reference being had to the accompanying drawings forming part hereof, wherein like numerals refer to like parts throughout, and in which:

Figure 1 is a top plan view of the present invention;

Figure 2 is a side elevational view of Figure 1;

Figure 3 is a plan view of the two graduated slides that are used in the present invention; and Figure 4 is an enlarged transverse vertical sectional view taken substantially on the plane of section line 4—4 of Figure 1.

Referring now to the drawings in detail, wherein, for the purpose of illustration, there is disclosed a preferred embodiment of the present invention, the numeral 10 represents the cylindrical transparent shank of a mechanical pencil 12 having an axial bore 14 that is H-shaped in cross-section, as shown best in Figure 4 of the drawings. The shank 10 is preferably constructed from transparent clear plastic material and has integrally formed therewith a transparent index member or cross-piece 16 whose rounded convex ends 18 project laterally from diametrically opposite sides of the shank 10.

The flat side faces 20 and 22 of the index member 16 are tangent to the periphery of the cylindrical shank 10, whereby the index member 16 will tend to prevent rolling of the pencil 12 when the pencil is placed upon a horizontal surface.

A pair of spaced parallel hairlines 24 and 26 are suitably retained in parallel grooves or blind bores formed in the index member and the hairlines extend transversely across the bore 14 as illustrated in Figure 4. The blind bores for the hairlines may extend through the depth of the index member with the open ends of the blind bores sealed by cement or the like after the hairlines have been inserted in the said blind bores.

Back-to-back channel-shaped slides 28 and 30 are slidably received in the axial bore 14 with the opposed longitudinal ribs 32 and 34 in the bore 14 positioned in the interior of the slides to contact the inner walls of the slides and guide the slides during their movement in the bore 14. The side faces of the slides 28 and 30 are spaced from the concave side walls of the bore 14 and are provided with cooperating logarithmic scales 36, 38 and 40, 42 that will register with a selected one of the hairlines.

The slides 28 and 30 are slightly longer than the bore 14 so that the rear ends of the slides will be exposed from the bore 14 when the slides are inserted as far as possible in the bore 14. The rear ends of the slides constitute finger grips whereby the slides may be individually moved.

The slides 28 and 30 are preferably of ivory plastic with the scales 34, 38, 40 and 42 suitably scribed thereon by methods known in the art.

The convexed ends 18 of the index member will tend to magnify the portions of the scales adjacent or beneath the hairlines.

The operation of the slide rule for multiplication and division is as follows:

(1) The slide rule pencil is picked up with the left hand in such a manner that the front face is visible; (2) with the thumb and forefinger of the right hand, the extensions of the two slides are grasped; (3) the relative position of the two sides is set, one in relation to the other, at the desired setting simply by moving the thumb and forefinger of the right hand so as to make the slides move or slide in opposite directions; (4) the two extensions are firmly grasped, to prevent slipping, and both slides moved together until the desired setting is under the hairline, there being the benefit of magnification and a hairline, where a very accurate setting can be made; (5) then again, the two extensions are firmly grasped and moved together, in or out as the case may be, until the desired index or number, on the appropriate scale, is under the hairline; and (6) the answer is read under the hairline on the scale immediately opposite.

The operation of the slide rule for the extraction of the square and cube roots is as follows:

(1) The slide rule pencil is raised with the left hand in such a manner that the back face is visible; (2) the thumb and forefinger of the right hand are employed for grasping the extension of the appropriate slide; (3) the slide is moved out until the number is under the hairline; (4) the extension is released and the rule turned over with the left hand so that the front face is visible; and (5) the answer is read under the hairline on the slide which was moved out.

In view of the foregoing description taken in conjunction with the accompanying drawings, it is believed that a clear understanding of the device will be quite apparent to those skilled in this art. A more detailed description is accordingly deemed unnecessary.

It is to be understood, however, that even though there is herein shown and described a preferred embodiment of the invention, the same is susceptible to certain changes fully comprehended by the spirit of the invention as herein described and within the scope of the appended claims.

Having described the invention, what is claimed as new is:

1. A calculating device comprising an elongated transparent cylinder having an axial bore, said bore being H-shaped in cross-section, and a pair of back-to-back channel-shaped graduated slides received in said bore for sliding movement.

2. A calculating device comprising an elongated transparent cylinder having an axial bore, said bore being substantially H-shape in cross-section, a pair of back-to-back channel-shaped graduated slides received in said bore for relative sliding movement, each of said slides having an end portion projecting outwardly from one end of the cylinder, said slides having cooperating logarithmic scales thereon, and a rigid, transparent crosspiece integrally formed with the cylinder and having hairlines therein extending transversely across the slides.

3. In a pencil including a transparent shank having an axial bore that is H-shaped in cross-section, a calculating device comprising a pair of back-to-back channel-shaped slides slidably positioned in the bore for relative sliding movement, said slides having cooperating logarithmic scales thereon, and a transparent index member forming part of the shank and having hairlines therein extending transversely across both slides.

4. The combination of claim 3 wherein said index member includes convexed ends registering with the scales for magnifying the indicia of said scales.

5. A calculating device comprising an elongated transparent cylinder having an axial bore, graduated slides received in said bore, and a cross member formed with the cylinder and having hairlines therein for the graduations on the slides, said member having convex end portions for magnifying the graduations.

GERALD L. CHERYMISIN.

No references cited.